Dec. 24, 1957 L. W. F. KAMPSCHMIDT 2,817,661
RECOVERY OF LACTAMS FROM THE REACTION PRODUCTS
OBTAINED BY BECKMANN TRANSFORMATION
OF CYCLIC KETOXIMES
Filed Aug. 17, 1953
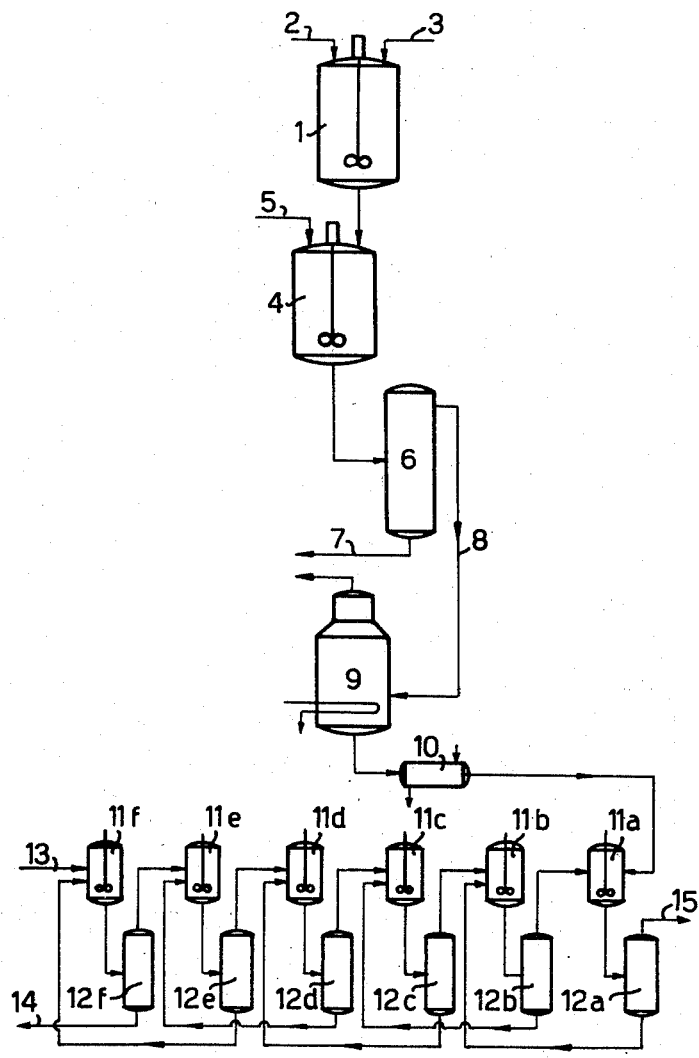
INVENTOR:
LEONARD W. F. KAMPSCHMIDT
BY: Cushman, Darby & Cushman
ATTORNEYS

2,817,661

RECOVERY OF LACTAMS FROM THE REACTION PRODUCTS OBTAINED BY BECKMANN TRANSFORMATION OF CYCLIC KETOXIMES

Leonard W. F. Kampschmidt, Beek, Netherlands, assignor to Stamicarbon N. V., Heerlen, Netherlands Application August 17, 1953, Serial No. 374,758

Claims priority, application Netherlands September 2, 1952

4 Claims. (Cl. 260—239.3)

The present invention is concerned with the recovery of lactams from the reaction products obtained by Beckmann transformation of cyclic ketoximes.

It is well known that lactams can be obtained by Beckmann transformation of cyclic ketoximes with sulfuric acid. Reaction of the ketoxime with sulfuric acid yields a sulfuric acid-lactam mixture which, after neutralization and subsequent separation of the resulting aqueous salt solution, gives a water-containing lactam oil which generally has a lactam content of about 70% by weight. From this oil, the lactam is usually recovered either by distillation in vacuo or by extraction with an organic solvent, such as benzene, followed by distillation of the solvent.

Lactams obtained in the manner described above suffer from the fact that they invariably contain a small amount of impurities which cannot be completely removed, even after repeated distillation, and cause a yellowish-brown discoloration of the lactam under the influence of light and air. Such contaminated lactams are not suitable for certain uses, for example, in the manufacture of polymers, because the impurities therein also produce discoloration, deterioration, and the like, in the polymers with the result that the latter are unsuitable for fabricating into filaments, fibers, films, and other shaped or molded products.

For the purpose of eliminating the above mentioned impurities, it has been considered necessary to subject the lactam to a separate purification or extended solvent extraction in order to render the same fit for use in the preparation of polymers. As will be appreciated, however, such further purification is time consuming and otherwise unattractive, particularly from a commercial standpoint.

The principal object of the present invention is to provide novel improvements in recovering lactams from the reaction products obtained by Beckmann transformation of cyclic ketoximes.

A more specific object of the invention is to provide procedures for recovering lactams from Beckmann transformation reaction mixtures which are free from the disadvantages noted above in connection with prior procedures for obtaining lactams from such mixtures.

Another object of the invention is to provide procedures for obtaining lactams from Beckmann transformation reaction mixtures which are free from any tendency to discolor when exposed to light or air and are otherwise suitable for use in the production of polymers.

Still another object of the invention is to provide improvements in the recovery of lactams from Beckmann transformation reaction mixtures whereby the necessity for subjecting the lactam to repeated distillation, or other extensive purification steps in order to obtain the same in a form suitable for the production of polymers is eliminated.

A further object of the invention is the provision of simplified and commercially attractive procedures for recovering lactams in substantially pure form from reaction products containing the same.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

The foregoing objects are accomplished according to the present invention, by taking the water-containing lactam oil obtained by conventional neutralization of the reaction product resulting from Beckmann transformation of cyclic ketoximes and concentrating this oil, prior to solvent extraction thereof, until its lactam content amounts to from 80 to 90% by weight.

The success of the invention is due, at least to a large extent, to the discovery that by concentrating the lactam oil, as described above, the recovered lactam is free from any tendency to discolor when exposed to air and light. The exact reason for the success of the invention is not fully understood, although it is possible that concentration of the lactam oil minimizes hydrolysis of lactam to amino acid. In any event, however, the improved results of the invention are extremely surprising because it would normally be thought that decreasing the water content, or increasing the lactam content, in the lactam oil would make purification of the lactam by solvent extraction just that much more difficult. However, just the opposite has been found to be the case, that is, the impurities are readily separated by extraction from the lactam along with whatever water may be present thereby providing a very simple solution to a problem which hitherto has been difficult, if not impossible, to avoid.

Concentration of the oil to the desired lactam content, i. e., 80 to 90% by weight of the oil, can be effected in any convenient manner, e. g., by evaporation, preferably under subatmospheric or reduced pressure and at a pH of between 5 and 8.

It will be appreciated that the process of the invention is broadly applicable to the recovery of all lactams obtained by Beckmann transformation of cyclic ketoximes. Thus, for example, the present process may be used to recover the lactams derived from cyclopentanonoxime, cyclohexanonoxime, cycloheptanonoxime or alkylated derivatives of these oximes, respectively, by treatment with sulfuric acid or other catalysts conventionally employed in Beckmann transformation.

Neutralization of the lactam-containing reaction product obtained by Beckmann transformation, separation of the resulting water-containing lactam oil and water layer and extraction of the lactam from the concentrated oil with an organic solvent, particularly one which is water-immiscible, can be carried out in the usual manner. Thus, for example, the Beckmann transformation reaction product obtained by reacting cyclohexanonoxime with concentrated sulfuric acid (e. g., 90 to 100% acid) or oleum may be neutralized with ammonia, thereby forming a two layer system, namely, an aqueous solution of ammonium sulfate and a water-containing lactam oil. The two layers may then be separated by decanting after which the novel step of the present invention, namely, concentration of the lactam oil from a lactam content generally within the range of 60% to 72% by weight and most usually about 70% by weight, to a lactam content of about 80 to 90% by weight of the oil is effected. The thus concentrated oil may then be extracted with benzene or other solvent, after which the solvent is distilled to give a lactam, e. g., caprolactam where the cyclic ketoxime is cyclohexanonoxime, which is free from any tendency to discolor.

For the purpose of extracting the lactam from the concentrated oil, the amount of solvent utilized can be widely varied. Preferably, however, sufficient solvent is used to give an extract containing from 20 to 25% by weight of lactam. Satisfactory results can also be obtained when the lactam concentration in the extract is outside the preferred range stated above, but it is desirable to avoid lactam concentrations which are too high, since more impurities will be dissolved therein.

Extraction of the lactam with benzene or other water-immiscible solvent can be carried out in any convenient fashion. Preferably, this is accomplished as a continuous counter-current operation which offers the advantage that the number of extraction stages can be minimized.

An additional advantage of the present invention is the fact that it simplifies the extraction operation. Specifically, deviations occurring in the transformation or neutralization steps often cause differences in lactam concentration which have an adverse effect on the extraction and make it necessary in conventional procedures to maintain the extraction under close observation. However, by concentrating the water-containing lactam oil to a predetermined lactam content, it will be appreciated that the concentration of the oil to be extracted is constant, or substantially so, thereby permitting the extraction to be carried out with a minimum of supervision.

The invention is further illustrated, but not limited, by the following detailed example and the accompanying flow sheet, showing operations according to the invention.

*Example*

Into a Beckmann convertor provided with a powerful stirrer and referred to in the drawing by the numeral 1, equal quantities by weight of molten cyclohexanonoxime and 100% sulfuric acid were simultaneously and continuously introduced at 2 and 3, respectively.

The temperature in the reactor was maintained at about 110° C. The reaction product was continuously discharged into the neutralization vessel 4, the reaction mixture being neutralized in the vessel by stirring with aqueous ammonia introduced at 5.

The product was then transferred to separator 6 where it is separated into an aqueous ammonium sulfate solution and a water-containing lactam oil which contains 70% of caprolactam. The ammonium sulfate solution was drained from the separator at 7 and the water-containing lactam oil supplied through pipe 8 to the evaporator 9. The water-containing lactam oil was concentrated by evaporating it in vacuo in evaporator 9 until an 80% lactam solution was obtained. Thereafter the concentrated lactam solution was supplied to a cooler 10 and then to the first mixing vessel 11a of a continuously operating 6-stage counter-current extraction battery. The aqueous phase was passed through the extraction battery via separator 12a, mixing vessel 11b, separator 12b and so on, counter-currently to the benzene which was supplied to the last mixing vessel 11f at 13. The benzene phase passed through the extraction battery in the opposite direction, via separator 12f, mixing vessel 11e and so on. 3.2 kgs. of benzene per 1 kg. of 80% lactam oil were introduced into the extraction process.

0.14 kg. of a dark colored aqueous solution containing 0.1% of caprolactam were carried off at 14 for every kg. of lactam oil supplied. The amount of lactam-benzene solution discharged at 15 amounted to 4.06 kg. for every kg. of 80% lactam oil supplied and contained 20% by weight of caprolactam.

It was found that the caprolactam obtained after distillation of the lactam-benzene solution could be kept without showing any tendency to discolor.

By way of comparison, it can be stated that when water-containing lactam oil containing 70% of caprolactam was directly subjected to an extraction with benzene, about 12 extraction stages were found necessary for attaining the same degree of extraction.

It will be appreciated that various modifications can be made in the invention as described above without in any way deviating from the scope thereof as defined in the appended claims.

I claim:

1. In a process for recovering a lactam from the reaction mixture obtained by sulfuric acid rearrangement of a cyclic ketoxime selected from the group consisting of cyclopentanone oxime, cyclohexanone oxime, cycloheptanone oxime and alkylated derivatives thereof wherein said mixture is neutralized, the resulting aqueous salt solution and water-containing lactam oil separated from each other and the lactam in said oil extracted by treating the oil with an organic solvent for said lactam, the improvement which comprises concentrating the water-containing lactam oil which has been separated from the aqueous salt solution until the lactam content therein amounts to from 80 to 90% by weight of the oil prior to extraction of said lactam.

2. The improved process of claim 1, wherein said oil is concentrated by evaporation under reduced pressure and at a pH of between 5 and 8.

3. The improved process of claim 1, wherein the lactam is caprolactam obtained by sulfuric acid rearrangement of cyclohexanonoxime.

4. The improved process of claim 1 wherein the water-containing lactam oil possesses a lactam content of about 70% by weight prior to being concentrated.

References Cited in the file of this patent

UNITED STATES PATENTS

| 2,221,369 | Cass | Nov. 12, 1940 |
| 2,313,026 | Schlack | Mar. 2, 1943 |
| 2,692,878 | Kahr | Oct. 26, 1954 |

FOREIGN PATENTS

| 504,774 | Belgium | Aug. 14, 1951 |